Patented Jan. 19, 1926.

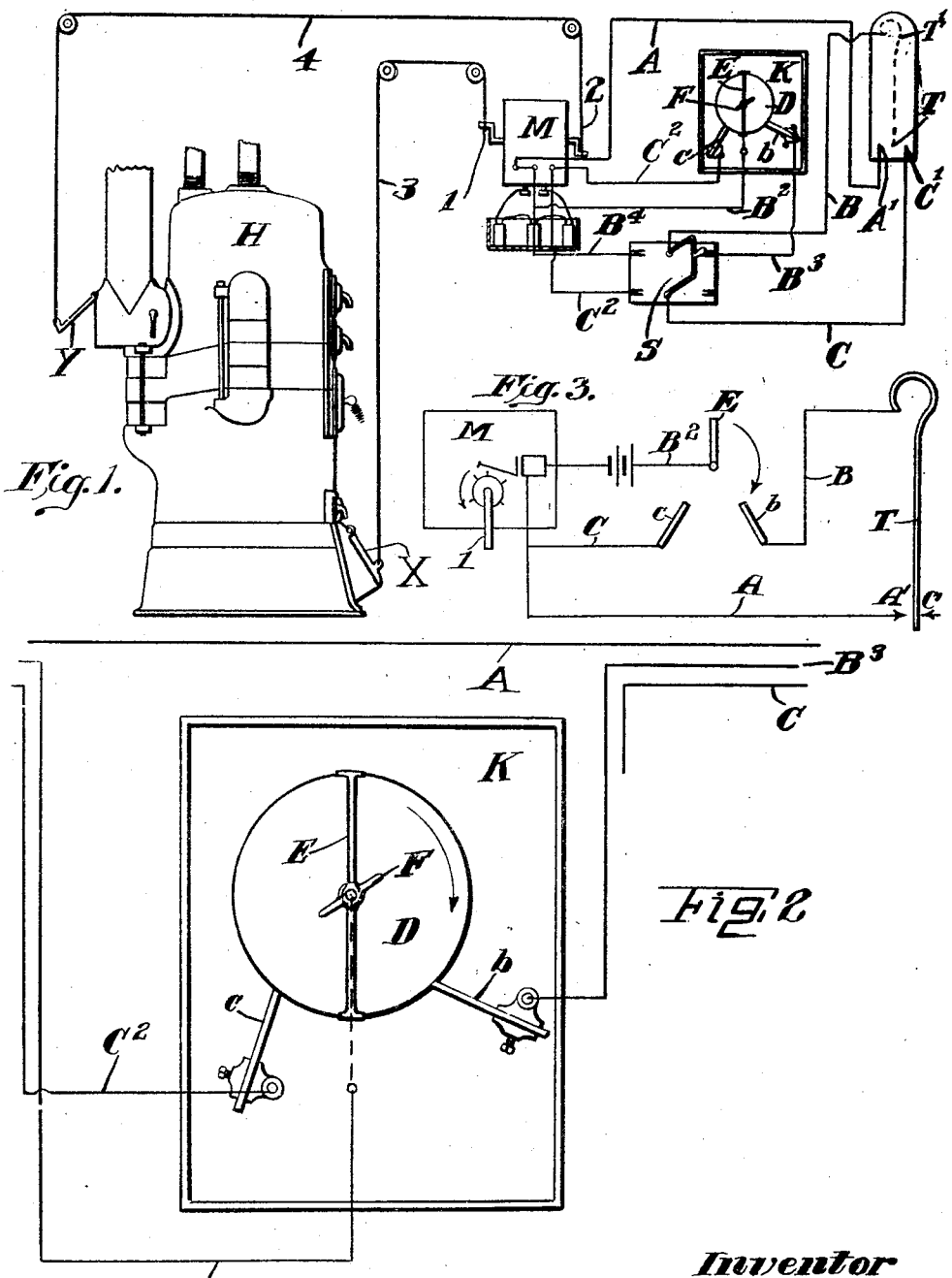

1,570,570

UNITED STATES PATENT OFFICE.

FRANKLIN LAWRENCE, OF PORTLAND, MAINE.

CONTROLLING DEVICE FOR HEATERS AND THE LIKE.

Application filed January 17, 1924. Serial No. 686,735.

*To all whom it may concern:*

Be it known that I, FRANKLIN LAWRENCE, a citizen of the United States, residing at Portland, county of Cumberland, State of Maine, have invented certain new and useful Improvements in Controlling Devices for Heaters and the like, of which the following is a specification.

With certain controlling devices, notably such as regulate the source or supply of heat or cold where the response is cumulative or augmentative in effect, it is frequently desirable that regulation be anticipated prior to normal. The field is large and the application of my invention somewhat varied but to the end of such brevity as will suffice for those skilled in the art, I will confine myself to a characteristic problem and a solution therefor each well adapted for the illustrative disclosure of my invention while the embodiment is in itself simple and satisfactory for practical use.

The regulation of a heat supply and particularly that of a combustion apparatus offers an example characteristic of the problems involved. Where a thermostat is employed it is usually located at a distant point and is separate from the heating system. As such, it is dependent on air temperature and thus in the case of hot water or steam there is a double medium between the condition of the combustion chamber and those at the thermostat. Thus the fire is subjected to overdraft for some time after it has reached a point where it is ample to produce the desired room temperature.

To meet this difficulty I introduce into the system means for periodically interrupting the normal control of the thermostat. In the accompanying drawings I show suitable and characteristic apparatus as follows:

Fig. 1 is a somewhat diagrammatic illustration of a system in accordance with my invention.

Fig. 2 shows a simple form of means for periodic interruption, and Fig. 3 is a somewhat diagrammatic view of the parts with the two way switch omitted to simplify the wiring.

In a system as shown the heater H is regulated by the usual drafts which we may designate as the air draft X, and the check draft Y. These are controlled by any form of motor actuated control M by which the draft doors are opened or closed. Such a system is old and well known and in such the arms 1 and 2 are turned to pull or release the chains 3 and 4 connecting with the draft doors X and Y.

My invention may be used in controlling the source or supply in various systems for heat, cold, light or other forms of energy. I shall discuss it herein particularly in its application to combustion apparatus but such reference is to be understood as illustrative rather than limiting.

The thermostat T which is connected with the line B may comprise the usual composite strip wound as at $T^1$ to give play to thermal influence so that its free end will be moved to contact with either point $A^1$ or $C^1$ to complete the circuit over the lines A or C.

If in these lines B and C there be interposed a control as at K the draft actuation will be correspondingly modified. Such a control may be variously devised. In the form shown in Fig. 2 the control may be a constantly driven make and break device. In such a form the disc D may be of insulating material as of rubber, fibre or like non-conducting substances. On such I locate a contact strip E. This may be fixed but is preferably adjustable as by the wing nut F and additional strips may be added to modify the periods of interruption.

It is to be noted that the normal wiring of the ordinary thermostatic control has been departed from in two particulars. The two way knife switch S has been interposed so that when thrown to the left (as shown in Fig. 1) the normal action of the thermostat will take place.

If the switch S is thrown to the right, the line B (or draft opening line) is connected with the brush $b$ and upon the arrival of the strip E is connected with the line $B^2$ to the operating circuit of the motor M. This gives the draft opening control of the motor which is interrupted periodically by the arrival of the strip E at the brush $c$ which short circuits the lines $B^2$ $C^2$ and releases the motor to close the drafts at least for that period, during which the strip E is returning to the brush $b$.

If the thermostat is still closed on the circuit A, i. e. is calling for more heat, it will reopen the draft for the period of rotation of the strip from brush $b$ to brush $c$. This gives a new stimulation to combustion which will be again checked when the strip E reaches the brush c during which time the fire may have accumulated enough combustion to be at the required working heat.

In Fig. 3 I have shown diagrammatically a somewhat simplified form of wiring in which the switch S is omitted. In this figure the contact C¹ is not connected up as it is not necessary. In this figure I have also indicated the motor box with a magnetic release for the crank shaft carrying the arms 1. It will be understood, of course, that in many installations the switch S would not be required and in such instances a simple form of wiring such as shown in Fig. 3 may be employed.

In this manner the thermostatic control may be interrupted so that periods are provided during which the augmented combustion may establish a heat generation sufficient (without excess) to the required temperature at the place of thermostatic control.

My invention may be variously applied and adapted to present systems of thermal regulation and the several specified factors variously modified or substituted and all without departing from the spirit of my invention if within the limits of the appended claims.

What I therefore claim and desire to secure by Letters Patent is:—

1. In combination with the draft control of a combustion apparatus, means for operating said draft control, a thermostatic circuit for operating the control to open the draft, and periodically effective means for intermittently closing the drafts for predetermined periods.

2. In combination with a draft controlled combustion apparatus, thermostatic control for opening up the draft and independent means periodically effective to close the drafts independent of the thermostat and to open the drafts again if demanded by the thermal control.

3. In combination with the draft control of a combustion apparatus, means for operating said control, a thermostatic regulator electrically connected with said draft, operating means for opening the draft and means independent of the thermostatic regulator and periodically effective to intermittently close the drafts for predetermined periods.

4. In combination with the draft control of a combustion apparatus, means for operating said control, a thermostatic regulator electrically connected with said draft operating means for opening the draft, and a clock independent of the thermostatic regulator and periodically effective to intermittently close the drafts for predetermined periods.

In testimony whereof I affix my signature.

FRANKLIN LAWRENCE.